(12) United States Patent
Choi et al.

(10) Patent No.: US 6,386,102 B1
(45) Date of Patent: May 14, 2002

(54) ALIGNMENT LAYER PRINTING DEVICE

(75) Inventors: Weon-Woo Choi, Suwon; Keun-Yong Lee, Bucheon; Gi-Pyeong Kim, Seoul; Kun-Jong Lee, Seoul; Jin-Ho Ju, Seoul; Soo-Im Jeong, Yongin; Bong-Woo Lee, Asan, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/475,794

(22) Filed: Dec. 30, 1999

(30) Foreign Application Priority Data

Dec. 31, 1998 (KR) .............................................. 98-62634
Dec. 6, 1999 (KR) .............................................. 99-55276

(51) Int. Cl.⁷ ................................................ B41F 31/00
(52) U.S. Cl. ...................................... 101/335; 101/328
(58) Field of Search ................................ 101/335, 363, 101/328; 347/73, 74, 75, 86; 430/137

(56) References Cited

U.S. PATENT DOCUMENTS 5,984,462 A * 11/1999 DeFilippis ................... 347/86
6,109,739 A *  8/2000 Stamer et al. ................ 347/73
6,183,931 B1 *  2/2001 Odell ........................ 430/137

* cited by examiner

*Primary Examiner*—Eugene Eickholt
(74) *Attorney, Agent, or Firm*—McGuireWoods LLP

(57) ABSTRACT

The present invention discloses an alignment layer printing device in which already used waste liquid is recovered for printing the alignment layer and can be reused in alignment layer printing. An alignment layer printing device consists of a raw material supplying device in which the alignment layer raw materials are supplied, a printing device in which the above raw materials that are supplied from the above raw material supplying device are printed on some object material, a recovery device in which the alignment layer raw materials that are not actually used in the printing are rerouted to the above raw material supplying device.

19 Claims, 6 Drawing Sheets

ALIGNMENT LAYER PRINTING DEVICE

CROSS REFERENCE TO RELATED APPLICATION

This application is based on application Nos. 98-62634 and 99-55276 filed in the Korean Industrial Property Office on Dec. 31, 1998 and Dec. 6, 1999 respectively, the contents of which are incorporated hereinto by reference.

BACKGROUND OF THE INVENTION (a) Field of the Invention

The present invention relates to an alignment layer printing device, more particularly to an alignment layer printing device for liquid crystal displays wherein waste alignment liquid materials collected after the printing of alignment layers can be reused.

(b) Description of the Related Art

The response of liquid crystal to external forces such as electric fields, etc. varies since their physical constants depend on the state of their molecular alignment. Therefore, liquid crystal molecular alignment control is an essential technology in display component construction as well as in liquid crystal physical property research. However, it is difficult to obtain a uniform molecular alignment simply by filling the gap between glass substrate plates with liquid crystal material. Therefore, it is common to form an alignment layer on the glass substrate plate.

Although an alignment layer can be made mainly of inorganic materials, organic materials, or a combination of both, organic materials are mainly used as the composition material of practical liquid crystal display components.

Since the introduction of SiO vacuum deposition suggested by Janning in 1972, the characteristic properties of liquid crystal materials have not been adversely effected by either the mass production of display components or the alignment control technology for liquid crystal display components. Hence, an alignment control technology employing suitable organic polymers for mass production has developed. That is, liquid crystal molecular alignment is controlled by rubbing organic polymer layers formed on glass substrate plates by a rotational coating method or a printing coating method, and then curing.

The rubbing method has been know since Mauguin observed in 1911 that the major axes of liquid crystal molecules become evenly aligned in a rubbed direction when glass substrate plates are rubbed in a certain direction by materials such as cloth, etc. Ever since then, even though many researchers have been investigation the rubbing method for appropriate substrate plates and thin layer materials, a definite selection basis for these materials has currently not yet established.

However, because of the use of high hydrolytic Schiff base liquid crystals since the beginning of the mass production of twisted nematic type LCD components, glass frit sealing capable of securing components reliably was essential, and hence polyimide based materials which exhibited no problems in high temperature treating processes were selected. Thereafter, polyimide based materials have proved to be more superior to other organic polymers in aspects of printing, rubbing, alignment control, and chemical stabilization, so that even today polyimide based materials are widely used as alignment layer materials of various LCD components.

Generally, polyimide based polymers synthesize polyamic acids by reacting diamine and acid anhydride in a solvent, wherein the material for printing is polyamic acid that becomes polyimide through the drying, heating, and curing processes after printing.

The methods for forming an alignment layer using this polyimide include various methods such as spinning, spraying, dipping, printing methods, etc., with the printing method currently being mainly used on account of it compatibility with mass production processes.

FIG. 1 is a schematic drawing outlining an alignment layer coating device using a printing method wherein alignment layer raw material that is necessary for coating is first passed through a supplying pipe (3) from an alignment layer raw material supplying container (2) and supplied by being dropped into the gap between a rotational doctor roll (8) and an anilox roll (6) through a syringe (4). The supplied alignment layer raw material is squeezed between the two rolls (6 and 8) resulting in the formation of a uniformed liquid layer on the surface of anilox roll (6). A copper plate (10) transfers the uniformly formed liquid film received from the anilox roll (6) onto the transferred substrate plate (18) placed on the transferring plate (16).

However, only about 30% of the polyimide solution dropped on the anilox roll (6) is used in the glass substrate plate printing while the remaining 70% is pushed by the doctor roll (8) oscillating on the anilox roll (6) and dropped into a waste liquid receiver (12) at an end of the anilox roll (6). A waste liquid (14) contained in the waste liquid receiver (12) is disposed into a waste liquid tank (22) through a waste liquid tube (20).

In this manner, manufacturing costs for a conventional alignment layer printing device increase due to excessive raw material costs since about 70% of solution out of the supplied alignment layer raw material is wasted, i.e., not actually used for the alignment layer printing.

Additionally, if the waste alignment material liquid is disposed without any special treatment, it can cause contamination of the environment.

SUMMARY OF THE INVENTION

It is an object of the present invention to provide an alignment layer printing device wherein the manufacturing costs are restrained and environmental contamination can be diminished by reusing waste alignment material liquid which is not used in the alignment layer printing and disposed into a waste liquid receiver.

DETAILED DESCRIPTION OF THE PREFERRED EMBODIMENTS

Figure 1:
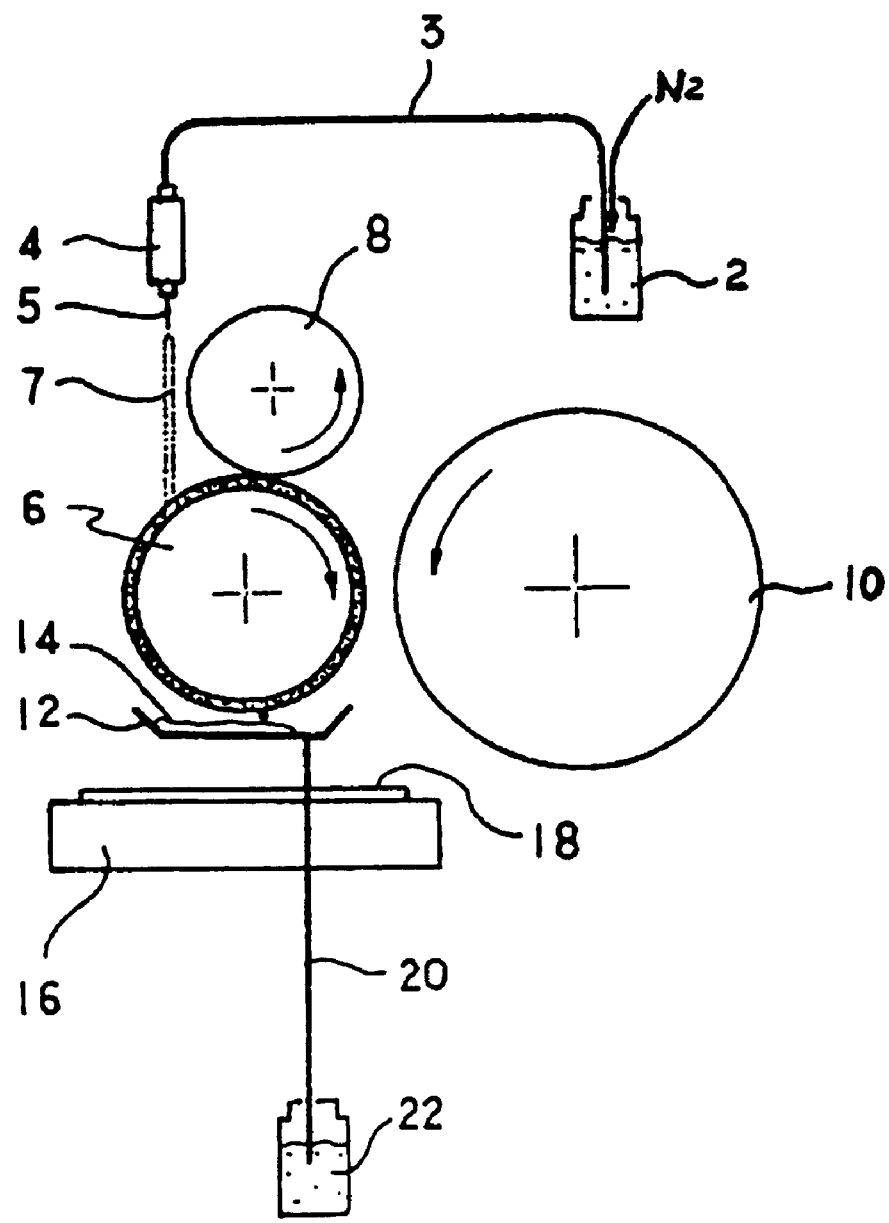
FIG. 1 is a schematic drawing outlining an alignment layer printing device according to the prior art technology.

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

In order to accomplish the above object, the present invention provides an alignment layer printing device comprising of:

i) a raw material supplying means supplying the alignment layer raw materials;

ii) a printing means which prints the above raw materials supplied from the above raw material supplying means on an object material; and iii) a recovery means which sends from among the above alignment layer raw materials supplied to the above printing means those alignment layer raw materials which do not participate in printing but are instead redirected to the above raw material supplying means.

Furthermore, the present invention provides an alignment layer printing device characterized in comprising the following:

(a) a raw material supplying means comprised of a raw material supplying container which is maintained at a low temperature of less than 20° C. by a low temperature maintenance device and in which an alignment layer raw material solution is contained, a raw material supplying pipe of which one end is connected with the above raw material supplying container and the other end is connected with a syringe to transfer alignment layer raw materials to a syringe, an aging unit which is installed at a certain location in the above raw material supplying pipe to increase the temperature of alignment layer raw materials to an appropriate temperature for printing, a valve for controlling supplying time and amount of alignment layer raw materials which are supplied to the above aging unit, and a syringe which injects raw materials transferred through the above raw material supplying pipe to a printing means;

(b) a printing device which prints raw materials supplied from the above raw material supplying means on a surface of an object material; and (c) a recovery means comprised of a waste alignment liquid collecting container receiving alignment layer raw materials alignment layer raw materials which are dropped down from the above printing means, a circulation pipe of which one end is connected with the above liquid collecting container and the other end is connected with a raw material supplying means to send alignment layer materials collected in the above liquid collecting container to the above raw material supplying means and in which a low temperature of less than 20° C. is maintained by a low temperature maintenance device, and an automatic valve installed at a certain location in the above circulation pipe automatically controlling transferring time and amount of waste liquid raw materials transferred from the above liquid collecting container to the above raw material supplying means.

Furthermore, the present invention provides an alignment layer printing device characterized in comprising the following:

(a) a raw material supplying means comprised of a raw material supplying container which is maintained at a low temperature of less than 20° C. by a low temperature maintenance device and in which an alignment layer raw material solution is contained, a gas supplying device for supplying an inert gas into the above raw material supplying container, a raw material supplying pipe of which one end is connected with the above raw material supplying container and the other end is connected with a syringe to transfer alignment layer raw materials to the syringe, an aging unit which is installed at a certain location in the above raw material supplying pipe to increase the temperature of alignment layer raw materials to an appropriate temperature for printing, a valve for controlling supplying time and amount of alignment layer raw materials which are supplied to the above aging unit, and the syringe which injects raw materials transferred through the above raw material supplying pipe to a printing means;

(b) a printing device which prints raw materials supplied from the above raw material supplying means on a surface of an object material; and (c) a recovery means comprised of a waste alignment liquid collecting container receiving alignment layer raw materials which are dropped down from the above printing means, a circulation pipe of which one end is connected with the above liquid collecting container and the other end is connected with a raw material supplying means to send alignment layer materials collected in the above liquid collecting container to the above raw material supplying means and in which a low temperature of less than 20° C. is maintained by a low temperature maintenance device, and an automatic valve installed at a certain location in the above circulation pipe automatically controlling transferring time and amount of waste liquid raw materials transferred from the above liquid collecting container to the above raw material supplying means.

Furthermore, the present invention provides an alignment layer printing device characterized in comprising the following:

(a) a raw material supplying means comprised of a raw material supplying container which is maintained at a low temperature of less than 20° C. by a low temperature maintenance device and in which an alignment layer raw material solution is contained, a gas supplying device for supplying an inert gas into the above raw material supplying container, a gas discharging pipe for discharging gas existing in the above raw material supplying container, a valve which is installed at a certain location in the above gas discharging pipe to control discharging time and amount of a discharging gas, a raw material supplying pipe of which one end is connected with the above raw material supplying container and the other end is connected with a syringe to transfer alignment layer raw materials to a syringe, an aging unit which is installed at a certain location of the above raw material supplying pipe to increase the temperature of alignment layer raw materials to an appropriate temperature for printing, a valve for controlling supplying time and amount of alignment layer raw materials which are supplied to the above aging unit, and the syringe which injects raw materials transferred through the above raw material supplying pipe to a printing means;

(b) a printing device which prints raw materials supplied from the above raw material supplying means on a surface of an object material; and (c) a recovery means comprised of a waste alignment liquid collecting container receiving alignment layer raw materials which are dropped down from the above printing means, a circulation pipe of which one end is connected with the above liquid collecting container and the other end is connected with a raw material supplying means to send alignment layer materials collected in the above liquid collecting container to the above raw material supplying means and in which a low temperature of below 20° C. is maintained by a low temperature maintenance device, and an automatic valve installed at a certain location in the above circulation pipe automatically controlling transferring time and amount of waste liquid raw materials transferred from the above liquid collecting container to the above raw material supplying means.

Furthermore, the present invention provides an alignment layer printing device characterized in comprising the following:

(a) a raw material supplying container in which an alignment layer raw materials are contained;

(b) a raw material supplying pipe of which one end is connected with the above raw material supplying container and the other end is connected with a syringe in order to transfer the alignment layer raw materials to the syringe;

(c) a syringe which injects raw materials transferred through the above raw material supplying pipe to a printing means;

(d) a printing means printing raw materials supplied from the above raw material supplying means on the surface of an object material;

(e) a first waste alignment liquid collecting container that collects the waste alignment liquid which drops off the above printing means;

(f) a first alignment liquid purity measuring means which is installed in the above first waste alignment liquid collecting container in order to detect the collected waste alignment liquid purity;

(g) a filter filtering the waste alignment liquid discharged from the above first waste alignment liquid collecting container;

(h) a second waste alignment liquid collecting container that collects the alignment liquid which passes through the above filter;

(i) a second alignment liquid purity measuring means which is installed in the above second waste alignment liquid collecting container in order to detect the filtered alignment liquid purity;

(j) a control means which controls whether to reuse or dispose waste alignment liquid contained in the first and second waste alignment liquid collecting containers based on purity values of alignment liquid inputted from the above first and second alignment liquid purity measuring means; and (k) a transferring means which transfers the above waste alignment liquid from the above first and second waste alignment liquid collecting containers to the above raw material supplying container according to the control signal of the above control means.

The present invention is described in detail as per the following discussion.

Figure 2:
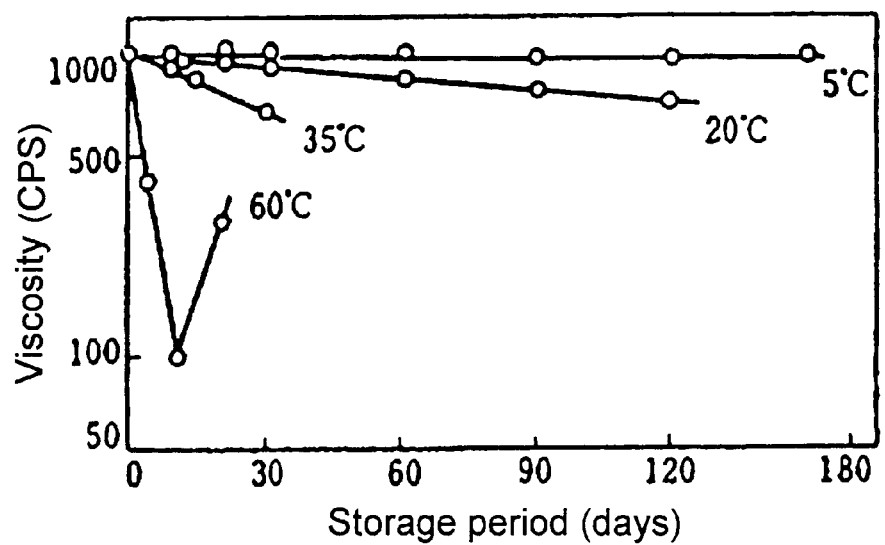
FIG. 2 is a graph illustrating viscosity variation according to alignment layer raw materials' temperature and storage period.

The present invention provides an alignment layer printing device comprising a raw material supplying means supplying alignment layer raw materials, a printing mean in which the above raw materials supplied from the above raw material supplying means are printed on object material, and a recovery means in which, from out of the above alignment layer raw materials supplied to the above printing means, the disposed alignment layer materials not used in the actual printing are sent to the above raw material supplying means. The above raw material supplying means comprises a raw material supplying container in which a liquid phase alignment layer raw material is contained in order to supply raw materials to a printing device, a syringe in which raw materials transferred through a raw material supplying pipe connected with the raw material supplying container are injected into the printing device, and automatic control valves by which supplying time and amount of alignment layer raw materials and inert gases supplied into a raw material supplying container are controlled. The above raw material supplying container is maintained preferably at a temperature of 20° C. or less by a low temperature maintenance device, more preferably 5° C. or less. FIG. 2 is a graph representing viscosity variation according to temperature and storage period of alignment layer raw material. As can be see from the graph, the viscosity of an undiluted alignment layer solution greatly influences a printing ratio.

FIG. 2 shows that maintaining the temperature at or below 20° C. can prevent a change of the viscosity of an undiluted alignment layer solution. The change of viscosity of an undiluted alignment layer solution is shown to be almost nonexistent at or below 5° C.

The above low temperature maintenance means is generally a cooling jacket, however, it is not necessarily restricted to that. When the raw material supplying container is maintained at a low temperature by a low temperature maintenance means, the temperature of an undiluted alignment layer solution is increased to an appropriate temperature for printing from a low temperature below 20° C. using an aging unit. Preferably, an automatic control valve is used in order to control a supplying time and amount of an undiluted alignment layer solution into the above aging unit.

Furthermore, a raw material supplying means of the present invention further comprises preferably a gas exhaust pipe. The above gas exhaust outlet is a device in which gases existing in the raw material supplying container are exhausted. The above exhausted gases are air or nitrogen gas, of which air is particularly not desired since it contains moisture which causes hydrolysis and a resulting change of the viscosity of alignment layer raw materials.

The above air exhaust pipe is preferably designed such that an influx of external air is impossible, even though an exhaust of internal air is possible, as the pipe has a check type valve. The above air exhaust pipe preferably comprises an automatic control valve controlling an exhaust time and amount of an exhausted gas at a certain location in the above air exhaust pipe.

The above printing means of the present invention comprises a first roll in which raw materials supplied from the above raw material supplying means are coated on its surface, a second roll which controls in such a manner that raw materials coated on the above first roll are uniformly applied and adhered to the surface of the above first roll, and the third roll in which raw materials coated on the above second roll are printed on the surface of an object material that is to be coated with an alignment layer.

The above recovery means of the present invention comprises a waste liquid collection container collecting raw material which drop off the rolls and does not participating in the printing even though it has been supplied to the printing device, a circulation pipe connected with a waste collection container and the raw material supplying container, and an automatic control valve which is installed at a certain location in the above circulation pipe and controls supplying time and amount of the waste liquid collected in the above waste liquid collection container. A temperature of the above circulation pipe is maintained preferably below 20° C., more preferably below 5° C. by a low temperature maintenance device such that changes of the alignment layer waste liquid viscous properties are prevented. The above low temperature maintenance device is generally a cooling jacket, however it is not necessarily restricted to that.

Furthermore, the above, recovery means can further comprise a measuring device of alignment layer purity which is installed inside the above waste alignment liquid collecting container and detects the purity of a collected waste alignment liquid, and a controlling device which determines whether to send the above waste alignment liquid to a waste alignment liquid collecting container or to a raw material supplying container according to the alignment liquid purity values inputted from the above alignment layer purity measuring device. When the above purity measuring device and controlling device are included, severely contaminated waste alignment liquid or waste alignment liquid with greatly modified properties is not allowed to be sent to the raw material supplying container so that the contamination or change of alignment liquid properties can be prevented. In this case also, the circulation pipe transferring waste alignment liquid to the raw material supplying container is maintained preferably at a low temperature of below 20° C., more preferably below 5° C.

Furthermore, the above recovery means can comprises a first waste ft alignment liquid collecting container collecting waste alignment liquid which drops from the second roll of the above printing means, a first alignment liquid purity measuring device detecting the purity of collected waste alignment liquid which is installed inside the above first alignment liquid collecting container, a filter filtering a waste alignment liquid which is discharged from the above first waste alignment layer collecting container, a second waste alignment liquid collecting container collecting the alignment liquid which passes through the above filter, a second alignment liquid purity measuring means detecting the purity of a filtered alignment layer which is installed inside the above second waste alignment liquid collecting container, and a control means controlling whether to send waste alignment liquid to an alignment liquid supplying container or to a waste alignment layer collecting container from the above first and second waste alignment liquid collecting containers according to purity values of alignment liquid inputted from the above first and second alignment liquid purity measuring means. Thus a change of the properties of an alignment liquid in the raw material supplying container is prevented and a large amount of an alignment liquid can be obtained if the the above recovery means is used. In this case also, the circulation pipe in which waste alignment liquid is sent to the raw material supplying container is maintained at a low temperature of preferably below 20° C., more preferably below 5° C.

Furthermore, an alignment layer forming method using the printing method of the present invention is comprised of alignment layer coating, preliminary drying, and curing processes. Substrate plate loading and cleansing processes can be added before the alignment layer coating process and the unloading process, in which a substrate plate is removed from a curing furnace. These can also added after the curing process depending on circumstances.

Other objects, characteristics, and advantages of the present invention will be made clearer by the following detailed description of the various embodiments along with the associated attached drawings.

The preferable embodiments of the present invention are described below with reference to the attached drawings. However, the following embodiments are only for illustrating the present invention and the present invention is not restricted to the following embodiments.

Figure 3:
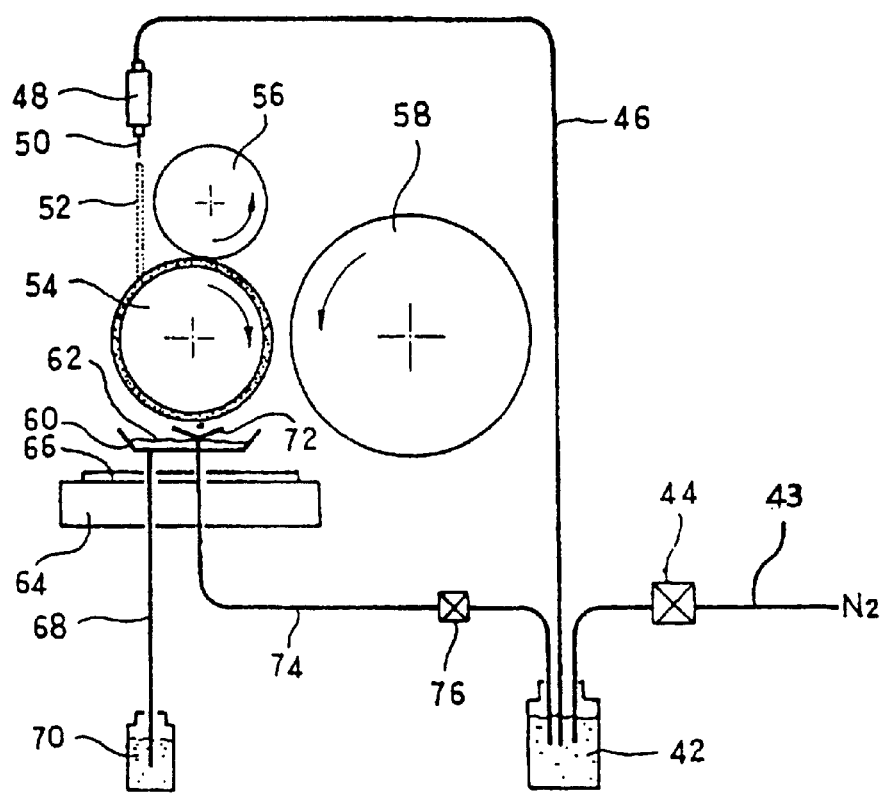
FIG. 3 is a schematic drawing outlining an alignment layer printing device according to a first embodiment of the present invention.

FIG. 3 is a schematic drawing outlining an alignment layer printing device according to the first embodiment of the present invention and represents the application of a FLEXO printing method, wherein the term 'FLEXO printing method' originates from the use of a flexible plate (FLEXO plate).

Referring to FIG. 3, an alignment layer printing device of the first embodiment of the present invention comprises a liquid collecting container (72) collecting alignment layer raw materials which are disposed into a waste liquid receiver (60) that are not used in printing, a circulation pipe (74) for retransferring alignment layer raw materials collected in a liquid collecting container (72) to a raw material supplying container (42) of which one end is connected with the liquid collecting container (72) and the other end is dipped into the raw material supplying container (42), and an automatic valve (76) which is installed at a certain location in the circulation pipe (74) and automatically controls transferring time and amount of a waste liquid transferred through the circulation pipe (74).

The raw material supplying container (42) is filled with polyimide alignment liquid raw material. One end of the raw material supplying pipe (46) is inserted into the raw material supplying container (42) in which alignment layer materials are contained in order to transfer an alignment layer raw material solution filled in the raw material supplying container (42). The other end of the raw material supplying pipe (46) is connected with a syringe (48) for injecting the liquid alignment layer raw materials transferred through the raw material supplying pipe (46) from the raw material supplying container (42).

Supply gases are necessary in order to transfer the alignment layer raw materials contained in the raw material supplying container (42) through the transferring pipe. Therefore, nitrogen gas ($N_2$) of a high purity is provided to raw material supplying container (42) through a gas supplying pipe (43) from a nitrogen gas supply part (which is not drawn). When nitrogen gas is supplied to the raw material supplying container (42), alignment layer raw material is transferred through the transferring pipe (46).

However, since the alignment layer printing is performed only while an object material (66) is fixed, an automatic valve (44) (hereinafter referred to as "the first automatic valve") for controlling gas supply time and amount is installed at a certain location in the gas supplying pipe (43).

The alignment layer raw material injected from the syringe (48) is printed on a substrate plate by a printing device comprised of plurality of rotating rolls. That is, the alignment layer raw material is first uniformly coated on the surface of a plurality of rolls, and secondly printed on the surface of the glass substrate plates transported to the lower part of the rollers.

The printing rolls comprise an anilox roll (54) or a first roll in which alignment layer raw material injected from the syringe (48) is coated on the surface, a doctor roll (56) or a second roll which rotates a minute distance from the anilox roll (54) so that raw material coated on the anilox roll (54) is evenly applied and adhered to the surface of the anilox roll (54), and a copper plate (58) or a third roll, whereon the raw material which has been uniformly coated on the surface of the anilox roll (54) by the mutual rotation of the anilox roll (54) and the doctor roll (56) is received to be printed on the object material (66), i.e., on the surface of the glass substrate plate for LCD panel.

Grooves are formed on the surface of the anilox roll (54) in order to retain the supplied liquid layer film.

The alignment layer raw material which is not supplied to the copper plate (58) from the anilox roll (54) during printing is dropped from one end of the lower side of the anilox roll (54). Therefore, a liquid collecting container (72) is arranged at the lower end of the anilox roll (54). The transferring pipe (74) is connected with a liquid collecting container (72) and the raw material supplying container (42) in order to transfer waste liquid collected in a liquid collecting container (72) to the raw material supplying container (42), and an automatic valve (76) (hereinafter referred to as "the second automatic valve") is installed at a certain location in the transferring pipe (74) in order to control transferring time and amount of alignment layer raw material which is transferred to the raw material supplying container (42) through the transferring pipe (74).

Additionally, a waste liquid receiver (60), which collects overflow waste liquid from the liquid collecting container (72) or waste liquid dropped from the anilox roll (54) that strays outside of the liquid collecting container (72) is located at the lower part of the liquid collecting container (72) and connected with the waste liquid tank (70) through a waste liquid tube (68).

Referring to FIG. 3, the printing process of an alignment layer printing device having the above arrangement is explained as follows.

First, an object material (66) for the alignment layer printing is placed on a transferring plate (64), e.g., a Thin Film Transistor substrate plate or a Color Filter substrate plate is lined up at the lower part of a copper plate (58).

After the first automatic valve (44) is opened and nitrogen gas is supplied into the raw material supplying container (42) through the gas supplying pipe (43), the liquid alignment layer material passes through a needle (50) of the syringe (48) via the supplying pipe (46) from the alignment layer raw material supplying container (42) and is dropped into a gap between the rotating doctor roll (56) and the anilox roll (54), wherein the second automatic valve (76) is in a closed state as long as the first automatic valve (44) is opened.

The coating liquid is squeezed between the two rolls (56 and 54) to form an even liquid layer on the surface of the anilox roll (54).

Methods for forming an even liquid layer include two types, i.e., a blade type in which the liquid layer of the anilox roll (54) surface is copied by a doctor roll (56), and another type in which a liquid layer of the anilox roll surface is squeezed by a doctor roll.

A liquid layer evenly coated on the anilox roll (54) is transferred onto the copper plate (58) and the copper plate (58) prints a liquid layer transferred from the anilox roll (54) onto the surface of the substrate plate.

When one cycle of dispensing is completed in the above procedure, the first automatic valve (44) is closed and the second automatic valve (76) is opened. Therefore, a liquid layer material which is dropped into the liquid collecting container (72), but not actually transferred onto a copper plate (58) from the anilox roll (54), is recovered into the raw material supplying container (42) through the circulation plate (74) and the second automatic valve (76).

The waste of alignment layer raw materials is practically prevented since even though alignment raw materials are supplied on the anilox roll (54) for printing, those materials that are not used in the printing are collected to be reused according to the above first embodiment of the present invention.

Furthermore, since there are almost no raw materials not used in printing disposed into the waste liquid tank, the time and cost consumed in waste liquid crystal treatment can be saved and environmental contamination caused by the waste alignment layer materials is also prevented as well.

On the other hand, the first embodiment of the present invention can bring about a deterioration of the quality of alignment layer raw materials since the purity of recovered alignment layer raw materials can decrease or contamination can result during the collecting process. Therefore, the second embodiment of the present invention comprises an alignment layer printing device in which a device is installed that maintains the temperature of the circulation pipe and raw material supplying container at 5° C. or less using a cooling jacket, discharges moisture containing air from inside the raw material supplying container using a gas discharging pipe, and is equipped with an aging unit that increases to an appropriate temperature for printing the low temperature alignment layer raw materials that are supplied to a printing device such that a change in properties and contamination of alignment layer raw materials are prevented.

Figure 4:
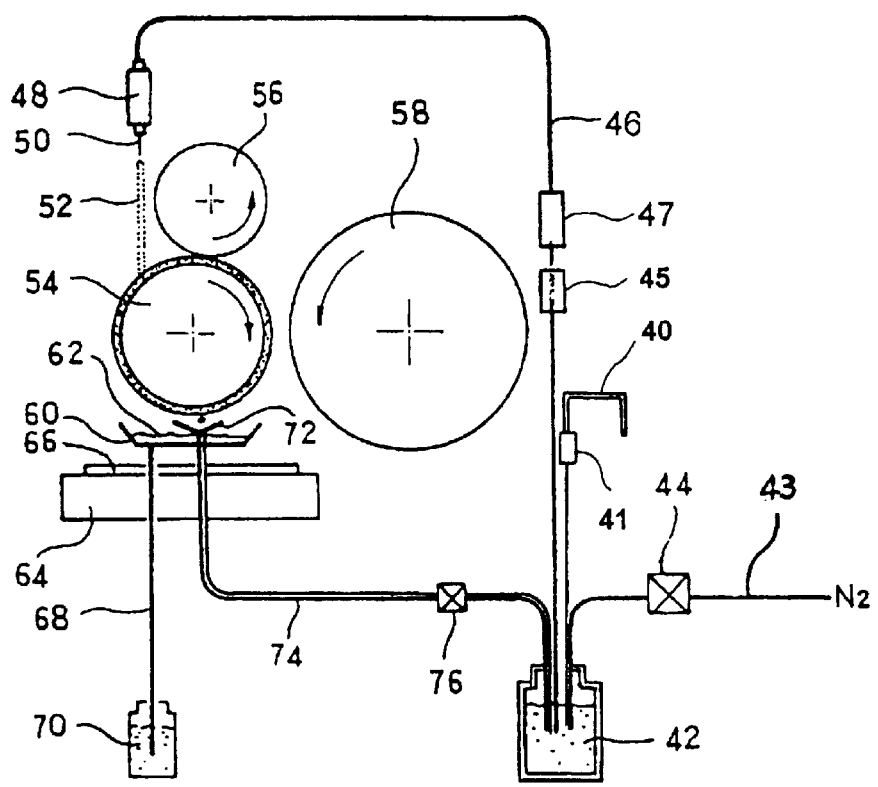
FIG. 4 is a schematic drawing outlining an alignment layer printing device according to a second embodiment of the present invention.

FIG. 4, as a schematic drawing outlining an alignment layer printing device according to the second embodiment of the present invention, a drawing in which those elements that are the same as the elements of the alignment layer printing device of FIG. 3 are partially omitted.

Referring to FIG. 4, an alignment layer printing device is comprised of a liquid collecting container (72) for collecting alignment layer raw materials which are not used in printing but instead are disposed into a waste liquid receiver (60), a circulation pipe (74) of which one end is connected with a liquid collecting container (72) while the other end is contained in a raw material supplying container (42) that is maintained at a temperature of 5° C. or less by a cooling jacket in order to retransfer the alignment layer raw materials collected in the liquid collecting container (72) to the raw material supplying container (42), and the second automatic valve (76) which is installed at a certain location in the circulation pipe (74) in order to automatically control transferring time and amount transferred through the circulation pipe (74).

The raw material supplying container (42) is maintained at a temperature of 5° C. or below by a cooling jacket. One end of a raw material supplying pipe (46) is inserted into the raw material supplying container (42) containing alignment layer raw materials in order to transfer alignment layer raw material solution contained in the raw material supplying container (42). A syringe (48) is connected with the other end of the raw material supplying pipe (46) in order to inject the liquid alignment layer raw materials transferred through the raw material supplying pipe (46) from the raw material supplying container (42). An aging unit (47) for increasing the low temperature of the alignment layer raw materials to the appropriate temperature for printing and a third automatic control valve (45) for controlling supplying time and amount of alignment layer raw materials into the aging unit (47) are installed at one side of the raw material supplying pipe (46).

A check valve type air gas discharging pipe (40) is installed in the raw material supplying container (42) in order to discharge air containing moisture outside of the raw material supplying container (42) and a fourth automatic control valve (41) is installed in the raw material supplying container (42) in order to control the discharged gas.

A gas supply is needed so that alignment layer raw materials contained in the raw material supplying container (42) can be transferred through the transferring pipe. Therefore, high purity of nitrogen gas ($N_2$) is supplied to the raw material supplying container (42) through a gas supplying pipe (43) from the nitrogen gas supply part (which is not drawn). When the nitrogen gas is supplied to the raw material supplying container (42), the alignment layer raw materials are transferred through the supplying pipe (47).

However, since the alignment layer printing is performed only while an object material is fixed, a first automatic valve (44) for controlling the gas supply time and amount is installed at a certain location in the gas supplying pipe (43).

The alignment layer raw materials injected from the syringe (48) is printed on a substrate plate by a printing device comprised of plurality of rotating rolls. That is, the alignment layer raw materials are first evenly coated on the surface of the plurality of rolls and secondly printed on a glass substrate plate that is transported to the lower part of a roll.

The printing rolls of the second embodiment of the present invention are comprised in the same manner as those of the first embodiment of the present invention.

Alignment layer raw materials that are not supplied to the copper plate (58) from the anilox roll (54) during printing are dropped from the lower side of the anilox roll (54). Therefore, the liquid collecting container (72) is arranged at the lower part end of the anilox roll (54). The transferring pipe (74) is connected with the liquid collecting container (72) and the raw material supplying container (42) in order to transfer waste liquid collected in the liquid collecting container (72) to the raw material supplying container (42). The transferring pipe (74) is maintained at 5° C. or below and encased with a cooling jacket in order to maintain a constant temperature. The second automatic valve (76) is installed at a certain location in the transferring pipe (74) in order to control transferring time and amount of alignment layer raw materials which are transferred to the raw material supplying container (42) through the transferring pipe (74).

Additionally, waste liquid receiver (60) connected with a waste liquid tank (70) through the waste liquid tube (68) is located at the lower part of the liquid collecting container (72) in order to collect overflow waste liquid from the liquid collecting container (72) or waste liquid which is dropped from the liquid collecting container (72).

With reference to FIG. 4, the printing process of an alignment layer printing device of the second embodiment of the present is described as follows.

First, the object material (66) for printing an alignment layer, e.g., a Thin Film Transistor substrate plate or a Color Filter substrate plate, is placed on the transferring plate (64), and arranged at the lower part of a copper plate (58).

When the first automatic valve (44) is opened and nitrogen gas is supplied into a raw material supplying container (42) through the gas supplying pipe (43), the liquid alignment layer raw materials pass through an automatic control valve (54) via the supplying pipe (46) from the alignment layer raw material supplying container (42) and its temperature is increased to a temperature appropriate for printing at the aging unit (46). The alignment materials with an increased temperature are then transferred to the syringe (48) through the supplying pipe (47) and dropped down between the rotating doctor roll (56) and anilox roll (54) through the needle (50) of the syringe (48), wherein while the first automatic valve (44) and the third automatic control valve (45) are opened, the second automatic valve (76) and the fourth automatic control valve (41) are in closed states.

The coating liquid is squeezed between two rolls (56 and 54) and forms an even liquid layer on the surface of the anilox roll (54).

The liquid layer evenly coated on the anilox roll (54) is transferred on the copper plate (58) which in turn prints the liquid layer transferred from the anilox roll (54) on the surface of the substrate plate (66).

When one cycle of dispensing is completed according to the above procedure, the third automatic valve (44) is closed, and the second automatic valve (76) and the fourth automatic control valve (41) are opened. Therefore, the liquid layer material which is not transferred on the copper plate (58) from the anilox roll (54), but which instead is dropped into the liquid collection container (72), is recovered in the raw material supplying container (42) through the circulation pipe (74) and the second automatic valve (76) when the first automatic control valve (41) is opened in order to remove air from the raw material supplying container (42).

According to the second embodiment of the present invention, the change of properties and contamination of alignment layer raw materials which are supplied to the anilox roll (54) for printing, but not actually used in printing, can be prevented. Furthermore, the environmental contamination that can be caused by the waste alignment layer raw material is prevented as well.

On the other hand, since the purity of the recollected alignment layer raw materials can not be confirmed in a device according to the first or second embodiments of the present invention, the purity of the supplied raw materials can deteriorate due to the mixing of raw materials initially contained in the raw material supplying container and raw materials collected after use. Therefore, the third embodiment of the present invention comprises an alignment layer printing device which can confirm the purity of an alignment layer collected in the liquid collecting container.

Figure 5:
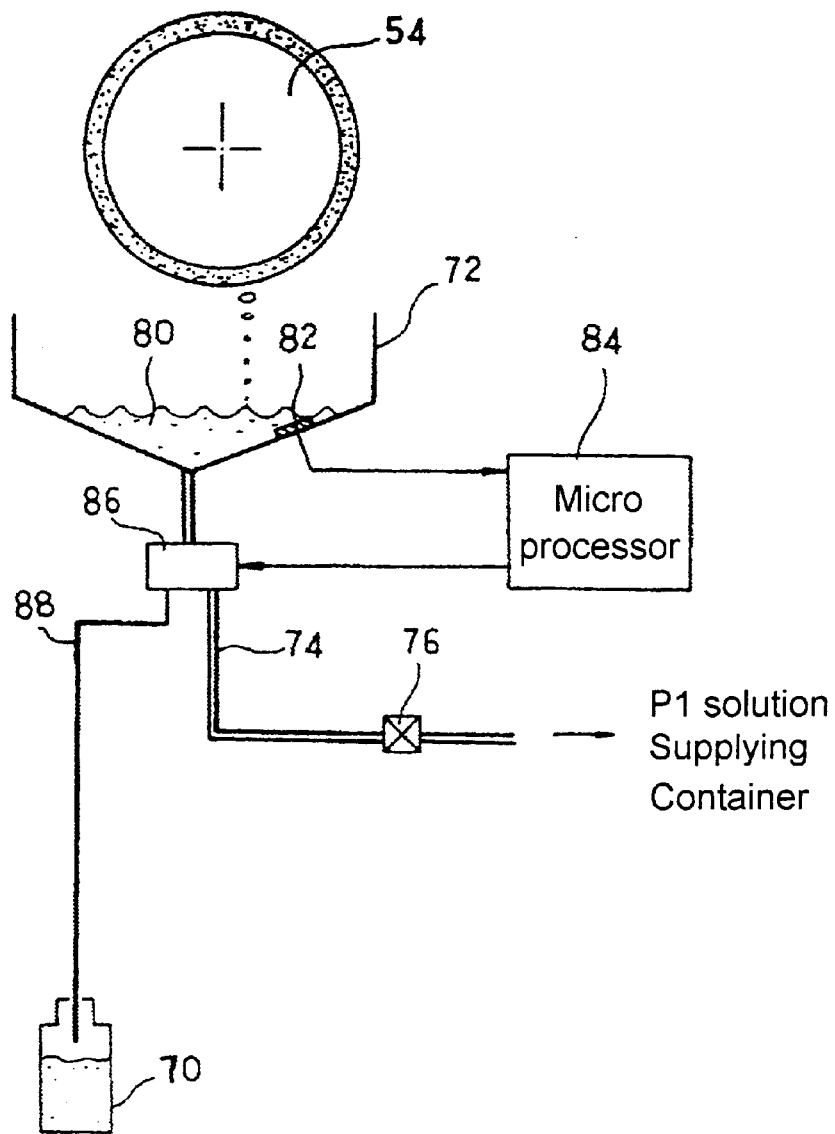
FIG. 5 is a schematic drawing outlining an alignment layer printing device according to a third embodiment of the present invention.

FIG. 5, a schematic drawing outlining an alignment layer printing device according to third embodiment of the present invention, is a drawing in which those elements that are the same as the elements of the alignment layer printing device of FIG. 3 or FIG. 4 are partially omitted.

Referring to FIG. 5, an alignment layer printing device of the third embodiment of the present invention comprises a purity measuring sensor (82) which is installed in a liquid collecting container (72) for collecting alignment layer raw materials in order to confirm the purity of the collected liquid phase raw materials that are not used in printing, but are rather disposed into a waste liquid receiver (60).

The purity measuring sensor (82) is connected with a microprocessor (84), a control means which determines whether to send alignment layer raw materials collected in the liquid collecting container (72) to a waste liquid tank (70) or to an alignment layer supplying container (42) based on the inputted alignment layer purity values. A separating device is installed at one end of the liquid collecting container (42). A separating device (86) separates and discharges alignment layer raw materials transferred from the liquid collecting container (72) such that alignment layer raw materials collected in the liquid collecting container (72) are transferred either to a waste liquid tank (106) or to the alignment layer supplying container (42) according to the control signal of the microprocessor (84).

The transferring pipe (88) is connected with one side of a discharge outlet of the separating device (86) in order to transfer the separated alignment layer raw materials to the waste liquid tank (70), and a circulation pipe (74) is connected with the other side of discharge outlet in order to transfer the separated alignment layer raw materials to the raw material supplying container (42). An automatic valve (76) or a second automatic valve is also installed at a certain location in the circulation pipe (74) in order to control transferring time and amount of alignment layer raw materials which are transferred to the raw material supplying container (42) from the liquid collecting container (72).

Even though it is not indicated in FIG. 5, the arrangement of the gas supplying pipe supplying the nitrogen gas into a raw material supplying container and the first automatic valve controlling the supplying amount and time of the nitrogen gas in the third embodiment of the present invention is the same as the arrangement in the first embodiment of the present invention.

Referring to FIG. 5, the printing process of an alignment layer printing device according to the third embodiment of the present invention is described in the following.

First, when the first automatic valve (which is not shown) is opened and nitrogen gas is supplied into a raw material supplying container (which is not shown) through a gas supplying pipe (which is not shown), the liquid alignment layer materials are dropped through a supplying pipe (which is not shown) from the alignment layer raw material supplying container and a needle (which is not shown) of a syringe (which is not shown) into a gap between a rotating doctor roll and anilox roll (54). The second automatic valve (76) is in the closed state while the first automatic valve is opened.

The coating liquid is squeezed between two rolls to make an unformed liquid layer on the surface of an anilox roll (54).

The uniformly coated liquid layer on the anilox roll (54) is transferred on a copper plate (which is not shown) which in turn prints a liquid layer transferred from the anilox roll (54) onto the surface of a substrate plate.

When one cycle of dispensing is completed in the above procedure, a first automatic valve is closed while a second automatic valve (76) is opened.

The purity of a liquid layer material, which was not transferred to a copper plate from the anilox roll (54) but instead dropped into the liquid collecting container (72), is measured by the purity measuring sensor (82). The measured purity is inputted into the microprocessor (84) which opens the discharge outlet of separating device (86) that is connected with the raw material supplying container when the inputted purity is over tolerance limits for reuse.

When a discharge outlet is opened, liquid layer material collected in the liquid collecting container is transferred to the raw material supplying container through the circulation pipe (74).

On the other hand, when the purity values inputted into a microprocessor (84) from the purity measuring sensor (82) are below the tolerance limits, the discharge outlet of a separating device (86) that is connected with a waste liquid tank (70) is opened by the control signal of the microprocessor (84). Therefore, the liquid layer material (80) collected in a liquid collecting container is transferred to the waste liquid tank (70) through the transferring pipe (88).

Quality deterioration of an alignment liquid due to the mixing of collected raw materials and unused raw materials is prevented according to the third embodiment of the present invention. This is because the reuse of collected raw materials is determined after a purity measurement of liquid layer materials which were supplied to the anilox roll (54) for printing but which were not actually used in the printing and instead collected in the liquid collecting container. As a result, alignment layer faults caused by the purity deterioration are prevented. Temperature can be maintained below 5° C. by encasing the circulation pipe (74) and the raw material supplying container (42) with a cooling jacket. Moisture containing air in a raw material supplying container is discharged outside the raw material supplying container (42) by installing a gas discharge pipe in order to prevent changes in the properties of the waste alignment liquid. Additionally, quality deterioration of the alignment liquid can further be prevented by increasing its temperature by using an aging unit during printing in the third embodiment as is done in the second embodiment of the present invention.

On the other hand, even though a device according to the third embodiment of the present invention can prevent purity deterioration caused by the mixing of the recovered alignment layer raw materials and new alignment layer raw materials, it has a lower reuse ratio of alignment layer raw materials when compared with the first embodiment of the present invention. Therefore, the fourth embodiment of the present invention provides an alignment layer printing device which can improve the reuse ratio of the collected alignment layer raw materials more effectively in addition to the advantages provided by the third embodiment of the present invention.

Figure 6:
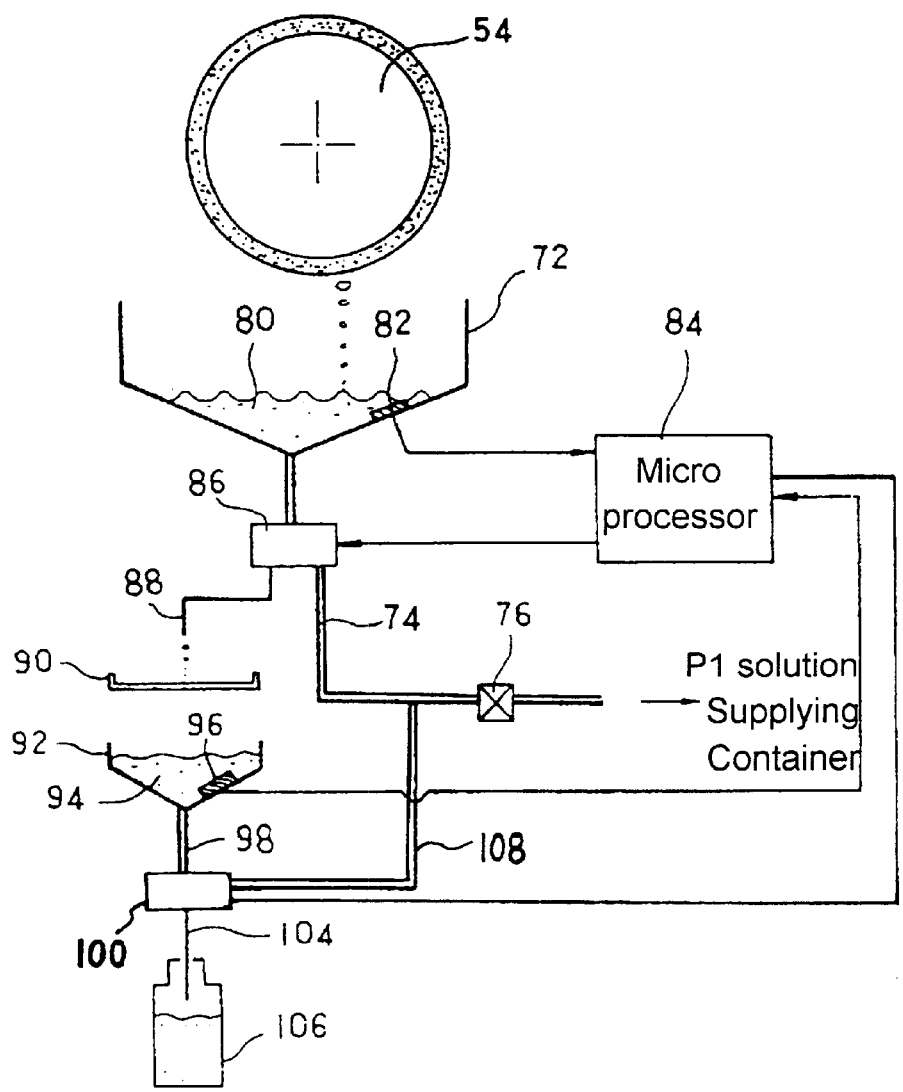
FIG. 6 is a schematic drawing outlining an alignment layer printing device according to a fourth embodiment of the present invention.

FIG. 6, a drawing outlining an alignment layer printing device according to fourth embodiment of the present invention, is a drawing in which those elements that are the same as the elements of the alignment layer printing device of FIG. 3 are partially omitted.

Referring to FIG. 6, an alignment layer printing device is comprised of a first purity measuring sensor (82) which is installed in a first liquid collecting container (72) for the primarily collection of alignment layer raw materials which are not used in printing but rather are disposed into a waste liquid receiver (60) so that the purity of the collected liquid phase raw materials is insured, a first separating device (86) for primary separation of the collected liquid phase raw materials, a filter (90) filtering the raw material having a reduced purity discharged from a first separating device (86), a second liquid collecting container (92) collecting the raw materials filtered by a filter (90), a second purity measuring sensor (96) which is installed in the second liquid collecting container (92) in order to measure the purity of the secondary collected raw materials, and a second separating device (100) in which the filtered raw materials (94) collected in the second liquid collecting container (92) are separated and discharged into a raw material supplying container or a waste liquid tank (106).

The first purity measuring sensor (82) and the second purity measuring sensor (96) are connected with a control means, i.e., a microprocessor (84). The microprocessor (84) controls the first and second separating devices (86 and 100) by determining, based on the purity value of an alignment layer inputted from the first and second purity measuring sensors (82 and 96), whether to send the alignment layer raw materials collected in the first and second liquid collecting containers (72 and 92) to a waste liquid tank (70) or instead to send them to a raw material supplying container (42)

The first separating device (86) separates and discharges the alignment layer raw materials transferred from the first liquid collecting container (72) such that the alignment layer raw materials collected in the first liquid collecting container (72) are transferred to the filter (90) or a raw material supplying container according to the control signal of the microprocessor (84). The second separating device (100) separates and discharges the alignment layer raw materials transferred from the second liquid collecting container (72) such that the alignment layer raw materials collected in the second liquid collecting container (92) are transferred to a waste liquid tank (106) or a raw material supplying container according to the control signal of the microprocessor (84).

The transferring pipe (88) is connected with one side of a discharge outlet of the first separating device (86) in order to transfer the separated alignment layer raw materials to the filter (90), and the circulation pipe (74) is connected with the other side of the discharge outlet in order to transfer the separated alignment layer raw materials to a raw material supplying container. Furthermore, an automatic valve (76) or a second automatic valve is installed at a certain location in the circulation pipe (74) in order to control transferring time and amount of the alignment layer raw materials which are transferred to the raw material supplying container (42) from the first liquid collecting container (72).

A transferring pipe (104) is connected with one side of a discharge outlet of the second separating device (100) in order to transfer the separated alignment layer raw materials to the waste liquid tank (106) while the second circulation pipe (108) is connected with the other side of the discharge outlet in order to transfer the separated alignment layer raw materials to the raw material supplying container (42). The above second circulation pipe (108) is connected between the first separating device (86) and the second automatic valve (76) to the other circulation pipe (74) of the first separating device.

Although not drawn in FIG. 6, the arrangement of the gas supplying pipe that supplies nitrogen gas into the raw material supplying container and a first automatic valve that controls the supplying amount and time of the nitrogen gas according to the fourth embodiment of the present invention is the same as that provided in the first embodiment of the present invention.

Referring to FIG. 6, the printing process of an alignment layer printing device having the above arrangement is described as follows.

First, since the coating process of an alignment layer is the same as in the first, second, and third embodiments of the present invention, its explanation is omitted here.

When one cycle of dispensing is completed in fourth embodiment of the present invention, the first automatic valve is closed while the second automatic valve (76) is opened.

The purity of liquid layer material which was not transferred onto the copper plate from the anilox roll (54) but instead dropped into the first liquid collecting container (72) is measured by the first purity measuring sensor (82). The measured purity is inputted into the microprocessor (84) which in turn opens the discharge outlet connected with the raw material supplying container of the separating device (86) if the inputted purity is above the tolerance limit for reuse.

The liquid layer material collected in a liquid collecting container due to the opening of the discharge outlet is transferred to the raw material supplying container through the circulation pipe (74).

On the other hand, when the purity values which are inputted into a microprocessor (84) from the purity measuring sensor (82) are below the tolerance limit, the other discharge outlet of the first separating device (86) is opened by the control signal of the microprocessor (84). The waste alignment liquid (80) collected in the liquid collecting container is filtered through the transferring pipe (88) at the filter (90).

The raw materials which are passed through the filter (90) are collected in the second liquid collecting container (92) and the second purity measuring sensor (96) measures the purity of the collected raw materials. The purity values measured at the second purity measuring sensor (96) are inputted in the microprocessor (84). When the inputted purity values are above the tolerance limit, the microprocessor (84) transfers the raw materials collected in the second liquid collecting container (92) to the raw material supplying container through the second circulation pipe (108) by opening the discharge outlet. However, when the inputted purity values are below the tolerance limit, the microprocessor (84) transfers the raw materials collected in the second liquid collecting container (92) to the waste liquid tank (106) through the discharging pipe (104) by opening the other discharge outlet.

Quality deterioration of alignment liquid material due to the mixing of collected raw materials and unused raw materials is prevented by the fourth embodiment of the present invention since the reuse of collected raw materials is determined after purity measurements of the liquid layer material which has been supplied to the anilox roll (54) for printing but which was not used in printing and was instead collected in the liquid collecting container. As a result, alignment layer faults caused by purity deterioration are prevented. Temperature can be maintained below 5° C. by encasing the circulation pipe (74 and 108) and the raw material supplying container (42) with a cooling jacket. Moisture containing air in the raw material supplying container (42) is also discharged by an installed gas discharge pipe (40) in order to prevent the change of properties of waste alignment liquid materials. Quality deterioration of the alignment liquid material can further be prevented by increasing its temperature by using an aging unit (46) during printing in the fourth embodiment of the present invention as was done in the second embodiment of the present invention.

As described in the above, the present invention not only minimizes the waste liquid but also maximizes the use efficiency of raw materials by directly recovering already used alignment layer raw materials which have been supplied to an anilox roll for printing but not actually used in printing and instead disposed into a waste liquid tank. This is done by separating and recovering the recovered waste liquid via purity measurement checks, or by filtering the recovered waste liquid for reuse. As a result, the manufacturing costs consumed in the alignment layer formation can be practically decreased.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An alignment layer printing device, comprising:
 a raw material supplying means supplying alignment layer raw material;
 a printing means printing the alignment layer raw materials supplied from the raw material supplying means on an object material; and
 a recovery means sending to the raw material supplying means those alignment layer raw materials that are not actually printed from among the alignment layer raw materials supplied to the printing means,
 wherein the raw material supplying means comprises a raw material supplying container containing alignment layer raw materials, and a raw material supplying pipe of which one end is connected to the raw material supplying container while another end is connected to a syringe so that alignment layer raw materials are transferred to the syringe, the syringe injecting the raw materials transferred through the raw material supplying pipe to the printing means, wherein the printing means comprises a first roll of which a surface is coated with raw materials supplied from the raw material supplying means, a second roll that is controlled to evenly apply the raw materials coated on the first roll to the surface of the first roll, and a third roll that prints raw materials coated on the first roll on the surface of an object material on which an alignment layer is to be coated, wherein the recovery means comprises a liquid collecting container that receives the alignment layer raw materials disposed from the printing means and a circulation pipe that is connected to one end of the liquid collecting container and sends the alignment layer raw materials collected in the liquid collecting container to the raw material supplying means, wherein the raw material supplying means further comprises an automatic control valve that controls supplying time and amount of alignment layer raw materials and inert gas to be supplied to the raw material supplying container, and wherein the recovery means further comprises an automatic valve installed in a certain location in the above circulation pipe that automatically controls transferring time and amount of waste liquid raw materials transferred to the raw material supplying means from the liquid collecting container.

2. An alignment layer printing device characterized in comprising:

(a) a raw material supplying means comprised of a raw material supplying container which is maintained at a low temperature of below 20° C. by a low temperature maintenance device and in which an alignment layer raw material solution is contained, a gas supplying device for supplying alignment layer raw materials and an inert gas into the raw material supplying container, a raw material supplying pipe of which one end is connected with the raw material supplying container and another end is connected with a syringe to transfer alignment layer raw materials to a syringe, an aging unit which is installed at a certain location in the above raw material supplying pipe to increase a temperature of alignment layer raw materials to an appropriate temperature for printing, a valve for controlling supplying time and amount of alignment layer raw materials which are supplied to the aging unit, and the syringe which injects raw materials transferred through the raw material supplying pipe to a printing means;

(b) a printing device which prints raw materials supplied from the raw material supplying means on a surface of an object material; and (c) a recovery means comprised of a waste alignment liquid collecting container receiving alignment layer raw materials which are dropped down from the printing means, a circulation pipe of which one end is connected with the liquid collecting container and another end is connected with a raw material supplying means to send alignment layer materials collected in the liquid collecting container to the raw material supplying means and in which a low temperature of below 20° C. is maintained by a low temperature maintenance device, and an automatic valve installed at a certain location in the above circulation pipe automatically controlling transferring time and amount of waste liquid raw materials transferred from the liquid collecting container to the raw material supplying means.

3. An alignment layer printing device characterized in comprising:

(a) a raw material supplying means comprised of a raw material supplying container which is maintained at a low temperature of below 20° C. by a low temperature maintenance device and in which an alignment layer raw material solution is contained, a gas supplying device for supplying alignment layer raw materials and an inert gas into the raw material supplying container, a gas discharging pipe for discharging a gas existing in the raw material supplying container, a valve which is installed at a certain location in the above gas discharging pipe to control discharging time and amount of a discharging gas, a raw material supplying pipe of which one end is connected with the raw material supplying container and another end is connected with a syringe to transfer alignment layer raw materials to the syringe, an aging unit which is installed at a certain location in the above raw material supplying pipe to increase a temperature of alignment layer raw materials to an appropriate temperature for printing, a valve for controlling supplying time and amount of alignment layer raw materials which are supplied to the aging unit, and the syringe which injects raw materials transferred through the raw material supplying pipe to a printing means;

(b) a printing device which prints raw materials supplied from the raw material supplying means on a surface of an object material; and (c) a recovery means comprised of a waste alignment liquid collecting container receiving alignment layer raw materials which are dropped down from the printing means, a circulation pipe of which one end is connected with the liquid collecting container and another end is connected with a raw material supplying means to send alignment layer materials collected in the liquid collecting container to the raw material supplying means and in which a low temperature of below 20° C. is maintained by a low temperature maintenance device, and an automatic valve installed at a certain location of the circulation pipe automatically controlling transferring time and amount of waste liquid raw materials transferred from the above liquid collecting container to the raw material supplying means.

4. An alignment layer printing device in accordance with claim 2 or claim 3, characterized in that the gas supplying device further comprises a gas supplying part, a gas transferring pipe transferring a gas supplied from the gas supplying part to the raw material supplying device, and a gas control valve which is installed at a certain location in the above gas transferring pipe to control supplying time and amount of the above gas.

5. An alignment layer printing device characterized in comprising:

(a) a raw material supplying means comprised of a raw material supplying container which is maintained at a low temperature of below 20° C. by a low temperature maintenance device and in which an alignment layer raw material solution is contained, a raw material supplying pipe of which one end is connected with the raw material supplying container and another end is connected with a syringe to transfer alignment layer raw materials to the syringe, an aging unit which is installed at a certain location in the raw material supplying pipe to increase a temperature of alignment layer raw materials to an appropriate temperature for printing, a valve for controlling supplying time and amount of alignment layer raw materials which are supplied to the above aging unit, and the syringe which injects raw materials transferred through the raw material supplying pipe to a printing means;

(b) a printing device which prints raw materials supplied from the raw material supplying means on a surface of an object material; and (c) a recovery means comprised of a waste alignment liquid collecting container receiving alignment layer raw materials which are dropped down from the printing means, a circulation pipe of which one end is connected with the liquid collecting container and another end is connected with a raw material supplying means to send alignment layer materials collected in the liquid collecting container to the raw material supplying means and in which a low temperature of below 20° C. is maintained by a low temperature maintenance device, and an automatic valve installed at a certain location in the above circulation pipe automatically controlling transferring time and amount of waste liquid raw materials transferred from the liquid collecting container to the raw material supplying means.

6. An alignment layer printing device in accordance with claim 5, claim 2 or claim 3, further characterized in that the temperatures of the raw material supplying container and circulation pipe are less than 5° C.

7. An alignment layer printing device in accordance with a claim 5, claim 2 or claim 3, further characterized in that the low temperature maintenance device is a cooling jacket.

8. An alignment layer printing device in accordance with claim 2 or claim 3, further characterized in that the gas is nitrogen gas.

9. An alignment layer printing device characterized in comprising:

(a) a raw material supplying container in which alignment layer raw materials are contained;

(b) a raw material supplying pipe of which one end is connected with the raw material supplying container and other end is connected with a syringe in order to transfer the alignment layer raw materials to the syringe;

(c) the syringe which injects raw materials transferred through the raw material supplying pipe to a printing means;

(d) the printing means printing raw materials supplied from the raw material supplying means on the surface of an object material;

(e) the first waste alignment liquid collecting container that collects the waste alignment liquid which drops off the printing means;

(f) a first alignment liquid purity measuring means which is installed in the first waste alignment liquid collecting container in order to detect collected waste alignment liquid purity;

(g) a filter filtering waste alignment liquid discharged from the first waste alignment liquid collecting container;

(h) a second waste alignment liquid collecting container that collects alignment liquid which passes through the filter;

(i) a second alignment liquid purity measuring means which is installed in the second waste alignment liquid collecting container in order to detect filtered alignment liquid purity;

(j) a control means which controls whether to reuse or dispose waste alignment liquid contained in the first and second waste alignment liquid collecting containers based on purity values of alignment liquid inputted from the first and second alignment liquid purity measuring means; and (l) a transferring means which transfers the waste alignment liquid from the first and second waste alignment liquid collecting containers to the raw material supplying container according to a control signal of the control means.

10. An alignment layer printing device in accordance with claim 9 characterized in that the transferring means comprises a first separating means which is connected with one end of the first waste alignment liquid collecting container in order to separate and discharge waste alignment liquid transferred from the waste alignment liquid collecting container according to the control signal of the control means; the first transferring pipe which is connected with one end of the first separating means in order to send the alignment layer raw materials transferred from the first separating means to the raw material supplying container; a valve for controlling the alignment layer raw materials which is installed at a certain location in the first transferring pipe in order to control transferring time and amount of the waste alignment layer raw materials that are transferred to the raw material supplying container from the first waste alignment liquid collecting container; a second separating means which is connected with one end of the second waste alignment liquid collecting container in order to separate and discharge the waste alignment liquid transferred from the second waste alignment liquid collecting container according to the control signal of the control means; and a second transferring pipe which is connected with one end of the second separating means in order to send the alignment layer raw materials transferred from the second separating means to the raw material supplying container.

11. An alignment layer printing device in accordance with claim 10 characterized in that the second transferring pipe is connected with the first transferring pipe at a certain location between the first separating means and the alignment layer control valve.

12. An alignment layer printing device in accordance with claim 10 or claim 11 characterized in that the above raw material supplying container and/or the above first transferring pipe and/or the above second transferring pipe is maintained below 20° C. by a low temperature maintenance device, and the above raw material supplying means further comprises an aging unit which is installed at a certain location of the raw material supplying pipe in order to increase the temperature of alignment layer raw materials to an appropriate temperature for printing and a valve for controlling the supply time and amount of alignment layer raw materials which are supplied to the aging unit.

13. An alignment layer printing device in accordance with claim 12 characterized in that the temperature of the raw material supplying container and/or the first transferring pipe and/or the second transferring pipe is less than 5° C.

14. An alignment layer printing device in accordance with claim 12 characterized in that the low temperature maintenance device is a cooling jacket.

15. An alignment layer printing device in accordance with claim 9 characterized in that the raw material supplying means further comprises a gas discharging pipe for discharging gas existing in the raw material supplying container and a valve for controlling discharging time and amount of gas which is to be discharged.

16. An alignment layer printing device in accordance with claim 9 characterized in that the raw material supplying means further comprises a gas supplying means for supplying the alignment layer raw materials and inert gas to the raw material supplying container.

17. An alignment layer printing device in accordance with claim 16 characterized in that the gas supplying means further comprises a gas supply part, a gas transferring pipe in which gas supplied from the gas supply part is transferred to the raw material supplying means, and a gas control valve which is installed at a certain location of the gas transferring pipe in order to control supplying time and amount of the gas.

18. An alignment layer printing device in accordance with claim 16 or claim 17 characterized in that the gas is nitrogen gas.

19. An alignment layer printing device in accordance with claim 17 characterized in that the valve for controlling alignment layer raw materials and the valve for controlling nitrogen gas are connected with the control means and are automatic valves of which their degree of opening is controlled according to the control signal of the control means.

\* \* \* \* \*